United States Patent [19]

Hacheney

[11] Patent Number: 4,568,196
[45] Date of Patent: Feb. 4, 1986

[54] DEVICE FOR PREPARING HIGH-QUALITY MIXTURES OF A SOLID AND A LIQUID

[76] Inventor: Wilfried Hacheney, Am Konigsberg 15, 4930 Detmold, Fed. Rep. of Germany

[21] Appl. No.: 582,119

[22] Filed: Feb. 21, 1984

[30] Foreign Application Priority Data

Feb. 22, 1983 [DE] Fed. Rep. of Germany ....... 3306071

[51] Int. Cl.⁴ .............................................. B01F 3/12
[52] U.S. Cl. .................................. 366/348; 366/601; 366/137; 241/46.17
[58] Field of Search ................. 366/601, 65, 132, 137, 366/193, 142, 98, 100, 348; 241/46.17, 97

[56] References Cited

U.S. PATENT DOCUMENTS

| | | | |
|---|---|---|---|
| 1,291,877 | 1/1919 | Herrbold | 241/97 X |
| 2,623,961 | 12/1952 | Holstein | 366/601 X |
| 3,556,487 | 1/1971 | Nauta | 366/100 X |
| 3,871,272 | 3/1975 | Melandri | 366/137 X |
| 3,920,227 | 11/1975 | Davis, Jr. | 366/601 X |
| 4,037,794 | 7/1977 | Melliger | 241/46.17 |
| 4,050,637 | 9/1977 | Eirich et al. | 241/46.17 X |
| 4,286,883 | 9/1981 | Johanson | 366/137 |
| 4,464,055 | 8/1984 | Mercatoris et al. | 366/65 X |

FOREIGN PATENT DOCUMENTS

| | | | |
|---|---|---|---|
| 6014 | of 1907 | United Kingdom | 366/193 |
| 689713 | 10/1979 | U.S.S.R. | 366/601 |

Primary Examiner—Philip R. Coe
Attorney, Agent, or Firm—Sprung Horn Kramer & Woods

[57] ABSTRACT

A device for preparing high-quality mixtures of a solid and a liquid extending to a colloidal system, for treating water or for introducing gases and liquids. The device has a mixture-receiving tank equipped with a motor-powered mixer that has a drive shaft provided with mixing elements. The mixing elements rotate at a peripheral speed ranging from 60 to 500 m/sec during an initial interval of the time taken to process a mixture of a solid and a liquid. Controls are provided that can reduce the peripheral speed of the mixing elements to a minimum in accordance with the viscosity of the mixture of a solid and a liquid. The minimum speed can range from to 20 to 60 m/sec and is maintained constant up to the end of the preparation time. The device can be operated discontinuously or continuously. In the latter case the heavy phase of the charge is conveyed into an extraction line by means of a pump and the light phase through a recirculation line back into the tank into which some of a fresh mixture of a solid and a liquid is introduced.

3 Claims, 1 Drawing Figure

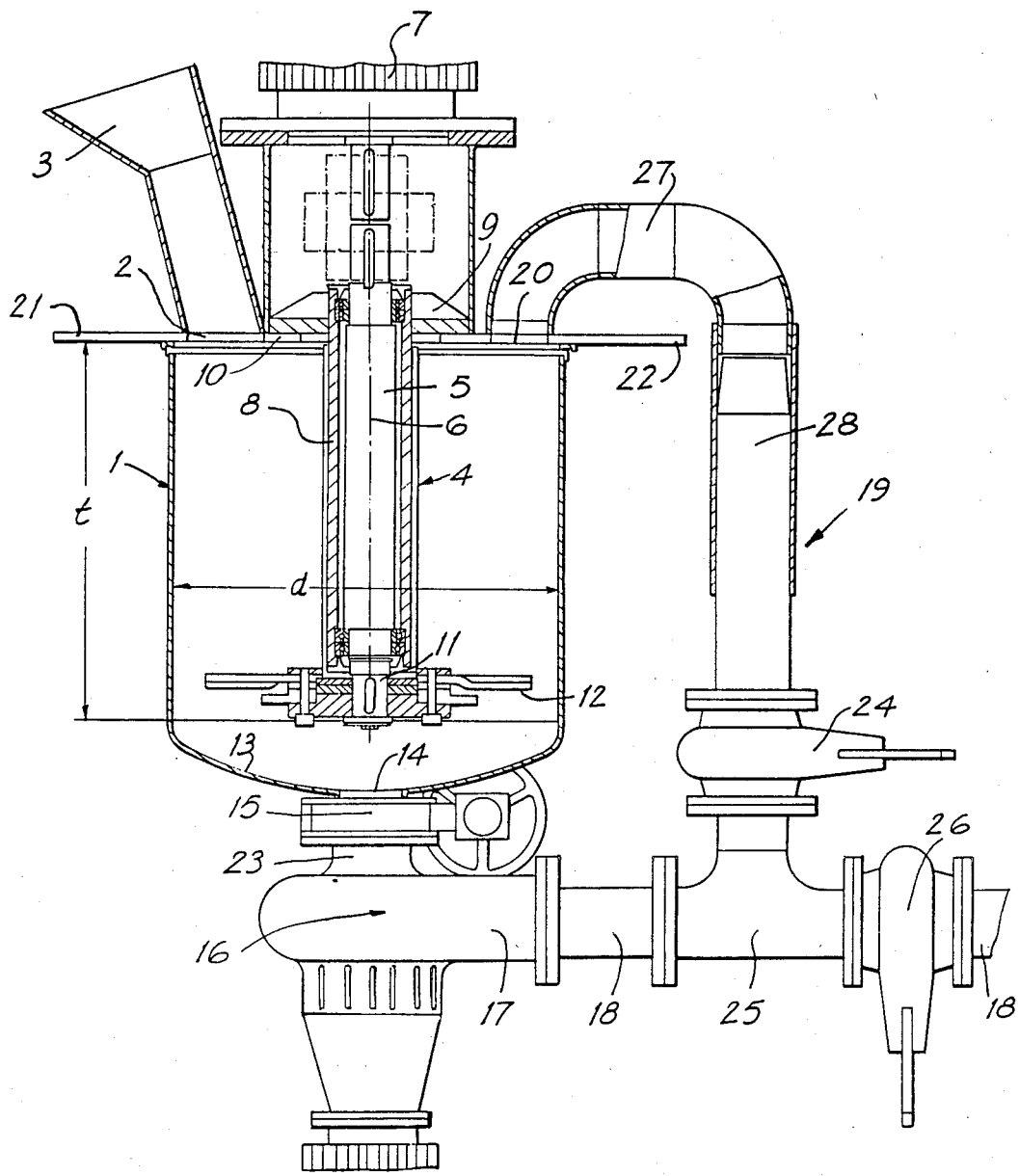

DEVICE FOR PREPARING HIGH-QUALITY MIXTURES OF A SOLID AND A LIQUID

BACKGROUND OF THE INVENTION

The present invention relates to a device for preparing high-quality mixtures of a solid and a liquid extending to a colloidal system, for treating water or for introducing gases and liquids, with a mixture-receiving tank equipped with a motor-powered mixer that has a drive shaft provided with mixing elements.

The pharmaceutical and foodstuffs industries utilize colloiders with mixers that rotate at moderate speeds to arrive at colloidal systems. Materials loaded into the colloiders are bound into a colloidal system when chemical control products are added. Mixing creates only the contact prerequisites for introducing chemical processes that actually bring about the colloidal system.

A mixture of a solid and a liquid can, however, also be converted into a colloidal system by purely mechanical and physical means.

Colloiders equipped with impellers, disks, or other mixing devices and powered to operate at high peripheral speeds are known. These systems powerfully accelerate the mineral or organic materials in the mixture to break them down in conjunction with their mutual friction into fine particles.

In known colloiders, the mixer is driven, subsequent to a preliminary stirring process, at high peripheral speeds that are maintained throughout the total processing time.

Since the viscosity of the mixture increases during processing, the wear and tear on the mixing tools is relatively high.

Furthermore, processing a mixture of a solid and a liquid with a mixer that rotates at a constant high speed takes a long time, as practice has demonstrated, to obtain the colloidal system.

SUMMARY OF THE INVENTION

The object of the present invention is to provide a device of the aforesaid type in which the time needed to process a mixture of a solid and a liquid into a colloidal system is essentially shorter.

This object is attained in accordance with the invention in that the mixing elements rotate at a peripheral speed ranging from 60 to 500 m/sec during an initial interval of the time taken to process a mixture of a solid and a liquid and in that controls are provided that can reduce the peripheral speed of the mixing elements to a minimum in accordance with the viscosity of the mixture of a solid and a liquid.

During the initial interval of the processing time, during which the viscosity of the mixture of a solid and a liquid is low, the mixer rotates at high peripheral speeds that are subsequently reduced in accordance with the increasing viscosity of the mixture. Matching the peripheral speed of the mixer to the viscosity of the mixture in this way is easy on the mixer. Furthermore, the overall processing time can also be essentially decreased thereby, increasing the output of the device and decreasing its energy consumption.

During the initial interval of the processing time the solid is highly accelerated by the mixing tools, breaking it down into fine particles, a process that is then continued by their mutual friction. The action of the friction, which is obtained in the initial interval of the processing time by the high peripheral speeds of the mixing tools, is maintained later as the tools continue to rotate at a minimum peripheral speed in the thickening mixture of a solid and a liquid.

These measures allow the smallest constituents, like vegetable seeds, virus, or cocci, to be broken down when the device is utilized to process sludge.

The size of the solid particles can be reduced to 5 um or less.

The device can be employed for mixtures of mineral and organic sludges, for stone mixtures to bring out latent-hydraulic properties and for stone casting and hydroceramic production, the last referring to the production of materials with a strictly mineral basis but with ceramic properties.

The device can be employed in the iron and steel industry as well for treating steel to obtain a partly or completely amorphous steel or iron structure.

It has turned out to be practical to rotate the mixing elements at a peripheral speed of 80 to 160 m/sec or 200 to 500 m/sec during the initial interval of preparing a mixture of a solid and a liquid, to reduce the speed to 20 to 60 m/sec during the second interval, and to maintain this speed constant up to the end of the preparation time.

The device can be employed in discontinuous operation. When operating discontinuously, a charge of a mixture of a solid and a liquid is loaded into the receiving tank, treated until a colloidal system forms, and then drawn off from the tank.

The device also makes it possible, however, to extract only some of the treated charge from the tank and convey the rest over a recirculation line back into the tank, to which some fresh mixture of a solid and a liquid is simultaneously added. This procedure can be continuous, with the heavy phase of the charge being treated in the tank always being removed from processing.

BRIEF DESCRIPTION OF THE DRAWING

A preferred embodiment of the invention will now be described with reference to the attached drawing wherein a device according to the present invention is shown in partial sectional view.

DETAILED DESCRIPTION OF THE INVENTION

The device has a stationary receiving tank 1 with a loading hole 2. The mixture of a solid and a liquid to be processed is supplied through loading hole 2 from a supply funnel 3. Inside receiving tank 1 is a mixer 4 with a drive shaft 5 that is mounted in such a way that it can rotate around a vertical axis 6 and is powered by a motor 7. The top and bottom of drive shaft 5 are mounted in such a way that they can rotate in a stationary tube 8 that is attached to an annular flange 9 fastened to the cover 10 of receiving tank 1. Two diametrically opposite impellers 12 are attached to the bottom pin 11 of drive shaft 5. The ratio of the diameter of the mixing element constituted by the two impellers 12 to the diameter d of receiving tank 1 should not be higher than 0.7.

The ratio of the depth t of immersion of mixer 4 to the clear height of receiving tank 1 should not be higher than 0.8.

In the floor 13 of receiving tank 1 is an extraction opening 14 that can be closed off with a slide 15. Downstream of slide 15 is a pump 16 with a conveyer connection 17 that communicates with an extraction line 18.

From this extraction line there branches off a recirculation line 19 that empties into the recirculation hole 20 in the cover of receiving tank 1. Both loading hole 2 and recirculation hole 20 can be closed off with slides 21 and 22 in the vicinity of the cover of tank 1.

The suction connection 23 of the pump 16 in the illustrated embodiment is flanged to the housing of slide 15.

A blocking slide 24 is positioned in the vicinity of extraction line 18 in recirculation line 19. Extraction line 18 has a blocking slide 26 downstream of junction 25 on the side facing away from receiving tank 1.

Recirculation line 19 consists of an upper, bent pipe 27 to which is attached a telescoping pipe 28.

When the total charge is to be removed from receiving tank 1 upon termination of treatment, slides 15 and 26 are opened and blocking slide 24 closed. The charge is then removed from receiving tank 1 into extraction line 18 by means of pump 16.

When only part of the charge is to be removed, blocking slide 24 is closed and the heavy phase of the charge, which has precipitated in the bottom of tank 1, is drawn off by means of pump 16 and forced into extraction line 18. Once the heavy phase has been removed, blocking slide 26 is closed, blocking slide 24 opened, and the light phase conveyed back into receiving tank 1 through recirculation line 19. A weight amount of a fresh mixture of a solid and a liquid is then introduced into tank 1 from supply funnel 3 before mixer 4 is turned on.

It will be appreciated that the instant specification and claims are set forth by way of illustration and not limitation, and that various modifications and changes may be made without departing from the spirit and scope of the present invention.

What is claimed is:

1. In a method of preparing high-quality mixtures of a solid and a liquid extending to a colloidal system, wherein the mixture of a solid and a liquid is placed in a receiving tank equipped with a motor-powered mixer that has a drive shaft provided at its free end with mixing elements, the improvement comprising rotating the mixing elements at a peripheral speed ranging from 60 to 500 m/sec during an initial interval of the time taken to process the mixture of a solid and a liquid, to impart the particles of the solid with a high acceleration leading to diminution of the particles, increasing the viscosity of the mixture of a solid and a liquid by the diminution of the solid particles and by further pulverization of the particles in conjunction with one another on the basis of the flow of the mixture of solid and liquid in the receiving tank generated by the mixing elements, and decreasing the peripheral speed of the mixing elements in accordance with increase in viscosity to a minimum that is maintained constant until the pulverization effect reduces the solid particles to a size of 5 m$\mu$ or less.

2. The method as in claim 1, wherein the mixing elements are rotated at a peripheral speed of 200 to 500 m/sec during the initial interval of preparing the mixture of the solid and the liquid and the speed is thereafter reduced to 20 to 60 m/sec and maintained constant up to the end of the preparation time.

3. The method as in claim 1, wherein the mixing elements are rotated at a peripheral speed of 80 to 160 m/sec during the initial interval of preparing the mixture of the solid and the liquid and the speed is reduced to 20 to 60 m/sec during and maintained constant up to the end of the preparation time.

* * * * *